United States Patent
Marche

(10) Patent No.: US 7,330,603 B2
(45) Date of Patent: Feb. 12, 2008

(54) METHOD AND DEVICE FOR ELECTRONIC IMAGE CAPTURE IN SEVERAL ZONES

(75) Inventor: Eric Marche, St Egreve (FR)

(73) Assignee: Thales, Inc., Velizy (FR)

( * ) Notice: Subject to any disclaimer, the term of this patent is extended or adjusted under 35 U.S.C. 154(b) by 1224 days.

(21) Appl. No.: 10/065,756

(22) Filed: Nov. 15, 2002

(65) Prior Publication Data

US 2004/0008905 A1 Jan. 15, 2004

Related U.S. Application Data

(63) Continuation of application No. PCT/FR02/00938, filed on Mar. 15, 2002.

(30) Foreign Application Priority Data

Mar. 16, 2001 (FR) .................................. 01 03627

(51) Int. Cl.
*G06K 9/36* (2006.01)
*G06K 9/40* (2006.01)
*G01J 1/32* (2006.01)
*G09G 3/28* (2006.01)

(52) U.S. Cl. ...................... 382/284; 382/274; 382/254; 382/282; 250/205; 345/63

(58) Field of Classification Search ................ 382/274, 382/284
See application file for complete search history.

(56) References Cited

U.S. PATENT DOCUMENTS

| | | | | |
|---|---|---|---|---|
| 4,343,021 A | * | 8/1982 | Frame ......................... 348/247 |
| 5,086,343 A | * | 2/1992 | Cook et al. .................. 348/247 |
| 5,659,360 A | * | 8/1997 | Mori et al. .................. 348/297 |
| 5,668,569 A | * | 9/1997 | Greene et al. .............. 345/103 |
| 5,737,015 A | | 4/1998 | Juen ......................... 348/230.1 |
| 6,072,603 A | * | 6/2000 | Parks .......................... 358/504 |
| 6,219,011 B1 | * | 4/2001 | Aloni et al. ................. 345/1.3 |
| 2001/0016057 A1 | * | 8/2001 | Eck et al. ..................... 382/132 |

FOREIGN PATENT DOCUMENTS

| | | | |
|---|---|---|---|
| EP | 1033868 A1 | * | 9/2000 |
| EP | 1111909 | | 6/2001 |

* cited by examiner

*Primary Examiner*—Jingge Wu
*Assistant Examiner*—José M Torres
(74) *Attorney, Agent, or Firm*—Lowe Hauptman Ham & Berner, LLP

(57) ABSTRACT

The invention relates to electronic image capture by an image sensor divided into several zones. To compensate for the inevitable differences between processing pathways arising from the various zones, there is provided a digital correction table inserted into one of the processing pathways. This table stores a corrected level for each level of image signal, the corrected level compensating for the difference with the other processing pathway for this signal level. The content of the table is update dynamically on the basis of observation of the actual images viewed by the sensor. A convergent algorithm is described, making it possible to correct the whole table on the basis of the observation of two border points, then to redo corrections on the whole table on the basis of the analysis of other border points of the same image or of subsequent images.

17 Claims, 4 Drawing Sheets

METHOD AND DEVICE FOR ELECTRONIC IMAGE CAPTURE IN SEVERAL ZONES

CROSS-REFERENCE TO RELATED APPLICATIONS

This is a continuation of International Application PCT/FR02/00938, with an international filing date of Mar. 15, 2002. The present application is based on, and claims priority from, French Application Number 01 03627, filed Mar. 16, 2001, the disclosure of which is hereby incorporated by reference herein in its entirety.

FIELD OF THE INVENTION

Detail Description

The invention relates to electronic image sensors, whether these images be visible, infrared, radiological, etc.

It relates more especially to image sensors which, by reason in particular of desired performance in terms of resolution, signal dynamic lange, and speed of operation, require the use of photosensitive matrix sensors divided into several zones each supplying a respective signal which is to be combined with the signals of the other zones so as to supply a complete image of a scene.

BACKGROUND OF THE INVENTION

An application of such sensors is in particular radiological imaging, either direct (photosensitive matrix sensors covered with a scintillator), or indirect (matrix sensor at the output of a radiological image intensifier tube). Typically, in the case of a sensor at the output of an intensifier tube, to get real-time images (30 images per second), with a very considerable dynamic range (up to at least 150,000 electrons per image point) and a high resolution (at least 1000×1000 points), it turns out to be necessary to divide the sensitive surface into two or four (or even more) image zones. The matrix sensor has as many outputs as there are zones. These outputs supply for example signals at a rate of 20 MHz if there were just one output, it would be necessary to multiply the output rate by two, or four, or more, but this is difficult if the dynamic range is considerable, the transfer time for large quantities of electrons being high.

The electronic signals arising from the various zones travel via different pathways until they join up into a stream of digital data representing the entire image. These pathways are theoretically identical but may have slight differences (different sensitivities, different amplifying coefficients, different offset voltages, etc). As a result, a uniform global image will clearly show up visible transitions between zones whereas these transitions do not exist in the original image. These transitions are visible on a uniformly grey image: one sees a chessboard where one ought only to see a uniform surface. However, they are also visible on any image, the eye being especially sensitive to correlated transitions in level. Here, the transitions are correlated in the sense that although the global image is any image whatsoever, the changes, even very slight (less than 1% difference in level), in grey level are situated on border lines, which are in general straight. The eye immediately spots these abnormal transitions in an image which a priori has no reason to contain them.

It has already been proposed that this phenomenon be corrected by passing the signal arising from the sensor, in analog form, to nonlinear correction circuits, correcting first-order nonlinearities of the various pathways. This solution is expensive in terms of circuitry, and rather inaccurate. It cannot correct nonlinearities of complex forms.

Another solution could be, in the case of an analog/digital conversion of the signal arising from the sensor and a subsequent digital processing, to consider a first processing pathway as reference pathway; the other pathways would be pathways to be corrected and would each comprise a digital correction table whose content would compensate for the differences between this pathway and the reference pathway. The signals of the reference pathway are transmitted as they are, and the signals of the pathways to be corrected are modified by the respective correction tables before being amalgamated with the signals of the reference pathway so as to reconstruct a global image amalgamating the various zones.

The correction table, or "look-up table", is a memory which matches a corrected value with each digital value representing a signal level. All the sensitivity differences, the nonlinearities, or the shifts in level, between the various pathways, can thus be very finely corrected.

The construction of the content of the various correction tables will thus in principle be done in the factory, on the basis of grey scale charts making it possible to detect, for each grey level, which behavior is exhibited by each signal processing pathway, so that for any grey level whatsoever, the final digital value output is the same whatever the processing pathway.

The procedure for constructing these correction tables, which differ from one image zone to another, and which differ from one product to another since not all the parameters which engender the small differences between pathways are controlled during production, is unwieldy and expensive. Furthermore, it cannot, without severely increasing the maintenance costs, be repeated periodically to take account of the aging of the products or of modifications due to ambient conditions (temperature in particular).

It is also possible to envisage the use of correction tables which, instead of being established on the basis of frozen images (grey scale charts), are established directly, in dynamic mode, in tandem with the use of the image sensor, on the basis of the images actually observed by the sensor. The table is not therefore contained in a read-only memory since its content is continually reappraised through the use of the sensor. The observation of image discontinuities for a luminance level present at the border between the two half-images, leads to the introduction into the table, for this luminance level value, of a correction coefficient aimed at eliminating this discontinuity.

However, the solutions indicated hereinabove are not entirely satisfactory from the point of view of correction performance, or they require overly complex correction algorithms. The purpose of the present invention is therefore to propose a device for image capture which does not exhibit the drawbacks of the prior art devices or of the devices using correction tables such as described hereinabove, and which efficiently correct the differences in the processing pathways for the various zones of an image.

BRIEF SUMMARY OF THE INVENTION

The invention is based in particular on the following remarks and on the statistical consequences which may be derived therefrom:

if the pairs of image points situated immediately on either side of the border between two zones are observed, two adjacent points of a pair ought usually to have practically identical luminance levels, whatever type of natural image is observed; or better still, if it is noted that a luminance gradient exists in the immediate proximity of a border, the level on one side of the border ought to be able to be deduced easily from the gradient observed on the other side;

along the border in one and the same image, the signal levels are diverse and varied, so that a single image makes it possible a priori to establish corrections for a series of different levels;

in several images, the levels are again different and make it possible a priori to establish yet other correction levels;

the corrections which one wishes to establish are corrections of analog hardware physical systems: they ought to correspond to a correction curve which is smooth (no steep zones, no discontinuities) and monotonic, so that if the need for a correction is detected for a certain signal level, it is without doubt also necessary to correct the neighboring levels.

From these remarks, the idea has been derived, according to the present invention, that it is possible to establish a correction table on the basis of examining the points adjacent to the border between zones (border points), through an iterative scheme which uses the points as they are (chart not required), by detecting the need for a correction for a signal level (need spotted by examining a pair of border points having this luminance level) and by then making a small correction not only for this level but also for the neighboring levels (preferably for a wide range of neighboring levels, or even for the entire table), and by repeating the detection and the correction for other pairs of border points of the same image or of subsequent images, corresponding to other signal levels.

There is therefore proposed according to the invention a method of processing an image arising from a sensor divided into at least two zones associated with different processing pathways, with a view to eliminating the defects due to the differences between these pathways, in which one zone is regarded as reference zone and the associated processing pathway is regarded as reference pathway, and another pathway, the so-called pathway to be corrected, comprises a correction table matching each signal level on input to the table, with a corrected level on output from the table, characterized in that the correction table is modified iteratively, during each new use of the sensor, according to the following steps:

measurement of signal levels arising from the processing pathways for a group of border points around the border between the two zones, determination of an abnormal divergence between the measurements on either side of the border, this divergence being the consequence of an inappropriate correction of a level on input to the table, memory storage of new values in the correction table for a series of input levels of the correction table around the level for which the correction is inappropriate, and repetition of these steps for other groups of border points.

The repetition is carried out according to the invention with a progressively convergent algorithm, that is to say the corrections performed are sufficiently small as to end up with a progressively stabilized table.

Abnormal divergence can be estimated in two particularly simple ways, other more complex solutions also being envisageable:

The first consists in considering that two adjacent points in an actual image should, at least statistically, have the same value. The divergence is then the difference between the levels measured for the two points at the output of the two processing pathways.

The second consists in considering that any image consists of local gradients of levels, and hence that, if there is a gradient in a zone at the level of points close to the border, the level on the other side of the border ought to follow this gradient; the discrepancy detected is then the discrepancy between the signal value for a point on one side of the border and the value which it ought to have by extrapolation of the measured gradient on the other side of the border.

A correction value, equal to a fraction of the divergence determined, will be added to the previous content of the correction table for a series of input levels of the table around the level for which the correction is inappropriate, both above and below this level. The correction may diminish as a function of remoteness with respect to this level.

In a particular embodiment, the correction diminishes for the input values of the table which are situated below this level, but is constant for the values situated above.

The correction envisaged in the table will preferably be a correction for all the levels of the table. It will preferably at maximum be a small fraction (for example a twentieth or a hundredth) of the divergence noted, so as not to risk abrupt and oscillatory modifications of the content of the table, and so as on the contrary to arrive progressively at convergence to a stable content of the table.

Finally, the method preferably comprises steps of verifying the monotonicity of the correction table, and also steps of smoothing the content of the table.

For an image divided into two lateral zones, right and left, the pairs of border points will be taken on one and the same line: a pair will comprise the last point of the first zone and the first point of the second zone. For an image divided into two superposed zones, top and bottom, the pairs of border points will comprise two points with one and the same column position, one in the last line of the first zone and the other in the first line of the second zone. For an image divided into four quadrants, top, bottom, right, left, it will be understood that the border zones may be chosen in several ways, and that a zone regarded as having to be corrected in relation to a reference zone (and therefore already comprising a correction table in its processing pathway) may be regarded as reference zone for another zone.

In correspondence with the method defined hereinabove, the invention proposes a device for electronic image capture, using a matrix image sensor divided into at least two zones and supplying a digital value for each image point, this digital value being computed in a first processing pathway for the points of the first zone and in a second processing pathway for the points of the second zone, the processing pathways being at least partly distinct, the second processing pathway at least being provided with balancing means for eliminating the visible defects engendered by the small differences existing between the two processing pathways, the balancing means comprising a digital conversion table matching each possible digital value $b_i$ on input to the table with another digital value $b'_i$ minimizing the influence of the differences between pathways, and means for dynamically modifying the content of this table on the basis of an analysis of a divergence between on the one hand the digital values of the signals arising from one processing pathway and corresponding to border points situated on one side of the border between the zones and on the other hand the digital values of the signals arising from the other processing pathway and corresponding to border points situated on the other side of the border, for any image observed while using the device, the modification being performed for a whole series of luminance values around a luminance value for which a divergence is noted.

The modifications of the table are made on the basis of the actual images, according to a convergent iterative scheme.

The device preferably comprises either a means of calculating the discrepancy between the values measured for the two points, or a means of calculating the discrepancy between on the one hand a point on one side of the border and on the other hand a prediction of the value of this point on the basis of several points situated on the other side of the border (in principle the prediction will be a simple linear extrapolation).

The device preferably further comprises a means for systematically writing corrected values to a series of points with address i of the table around a measured signal current value. It also comprises a means for calculating a correction to be made to the values previously stored in the table at these addresses i, this means being able to supply as correction value a fraction of the divergence found between the border points. The fraction is preferably a fixed percentage of the divergence, for the input values i situated above a determined value, and a variable percentage of this discrepancy, less than or equal to the fixed percentage, for all the values situated below the determined value. Preferably, the more remote, in terms of input value in the table, we are from the measured current value which gave rise to a discrepancy between processing pathways, the smaller is the percentage.

The correction table is a reprogrammable or random-access memory. It is however possible for a read-only memory to be associated with the table so as to contain a prior estimation (made in the factory for example) of the corrections to be made to a pathway; however, the content of this read-only memory, loaded initially into a random-access memory at the commencement of each new use of the sensor, will only temporarily constitute the content of the correction table, until this content is established dynamically through the use of the sensor, doing so on the basis of images which are not test charts but the actual images of the use.

BRIEF DESCRIPTION OF THE DRAWINGS

Other characteristics and advantages of the invention will become apparent on reading the detailed description which follows and which is given with reference to the appended drawings in which.

DETAILED DESCRIPTION OF THE INVENTION

Figure 1:
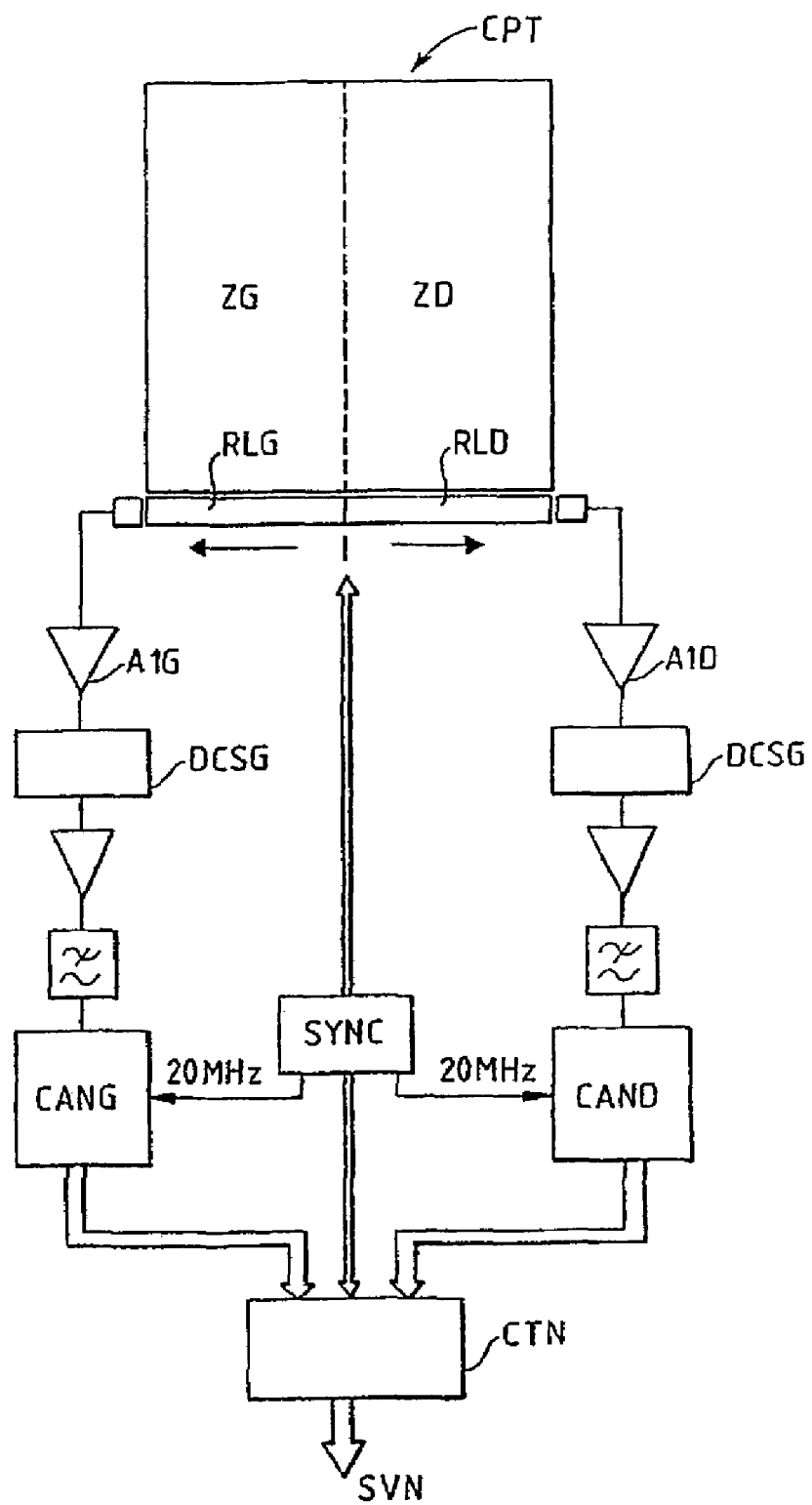
FIG. 1 represents the general structure of a two-zone electronic image capture device.

Recalled in FIG. 1 is the general structure of an electronic image capture device in which the image sensor proper CPT comprises two zones, in this example a right zone ZD and a left zone ZG, the electronic information arising from the two zones being processed in separate pathways. The sensor may be a matrix image sensor of small dimension (silicon-based integrated image sensor, of the CCD or CMOS type in particular) or of large dimension (radiological panel based on amorphous silicon on glass plates with sides several tens of centimeters long for example).

The right and left processing pathways each comprise for example a separate read register (RLD, RLG) followed by a respective read diode, an inverting amplifier (A1D, A1G), a sampling circuit (DCSG, DCSD) which is in practice a correlated twin sampler, conventional in the realm of video image digitization, a variable-gain amplifier, a low-pass filter, and finally an analog/digital converter (CAND, CANG). The outputs of the converters are processed in a digital processing circuit CTN one of whose functions is to amalgamate the information originating from the two pathways so as to establish at the output a digital video signal SVN according to a desired standard; this signal SVN corresponds to the global image detected by the sensor, with no distinction between a right zone and a left zone. The circuit CTN can have other functions unrelated to the present invention. A general synchronization circuit SYNC caters for the clocking of all the circuits.

By way of example, the image capture device has a high resolution, for example 1024 points×1024 points, a wide dynamic range, and a signal rate of 20 MHz at the output, the converters operating at 20 MHz and coding the luminances on 12 bits for each image point.

Even if one tries to make processing pathways which are as symmetric as possible, differences are inevitable and one and the same luminance level in the two zones will give, at the output of the converters CANG and CAND, slightly different digital values. Also, these differences will depend on the level of the signal, in a generally nonlinear manner.

This is why we shall balance the pathways by regarding one of them as a reference pathway and by correcting the other.

It will be noted that the invention makes it possible to balance the pathways not only in the simplest case where there are just two zones in the image and hence only two distinct processing pathways, but also in the case where there is any number of zones. In this case, a first zone A may be regarded as a reference zone and the corresponding processing pathway as a reference pathway; at least one other pathway, corresponding to a second zone B juxtaposed with the reference zone is a pathway to be corrected with respect to this reference pathway but may itself constitute a reference pathway with respect to a third pathway to be corrected, corresponding to a third zone adjacent to the second zone, and so on and so forth.

The invention will therefore be explained in detail only with regard to a division into two zones ZD and ZG. The processing pathway which will serve as reference will be described as comprising no level correction table, whereas it could comprise one if dealing with a secondary reference pathway itself corrected with respect to another primary reference.

The correction will be implemented in the CTN circuit, before amalgamating the signals arising from the left and right zones into a single video signal SVN.

Figure 2:
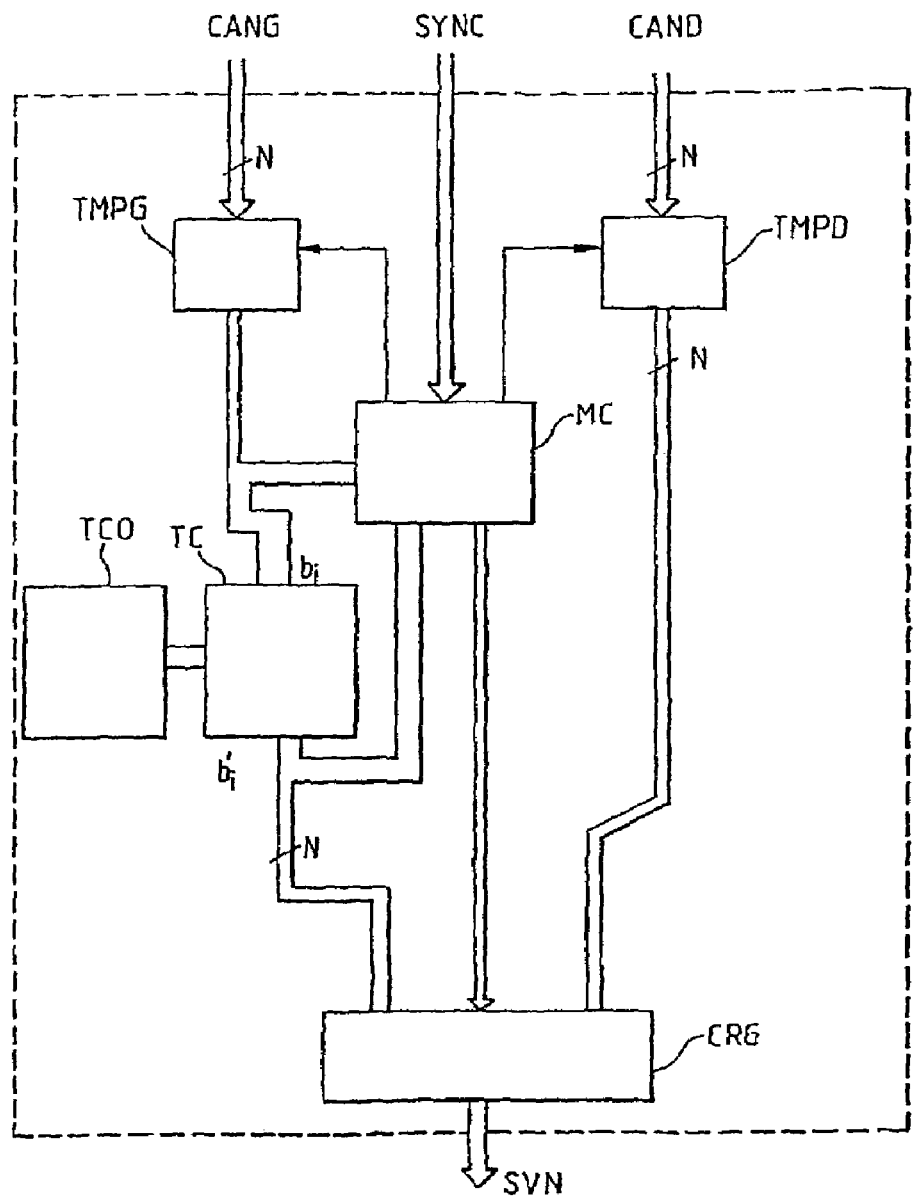
FIG. 2 represents the general structure of a device in which balancing means according to the invention are provided.

The structure of the digital signal processing circuit CTN which serves for the implementation of the invention is represented in FIG. 2; this circuit receives the digital values arising from the converters and representing the luminances of the successive points of each image zone; in principle the values arrive line by line, and, within a line, successively point by point for all the points of the line. The order is frozen and therefore the position of the image point for which a value is received from one or other of the converters is known at every moment. The digital values are coded on N bits (for example N=12).

The right pathway is regarded as reference and the image digital signals which originate from this pathway are sent, without being modified, to an amalgamating circuit CRG. The digital values of the signals of the left pathway are modified by a correction table TC which compensates for the differences between the right and left pathways; the modified digital values, still coded on N bits as if they had arrived directly from the converter CANG, are sent to the amalgamating circuit CRG. The circuit CRG knows the positions of the image points which arrive respectively from the right pathway and from the left pathway at every moment and retransmits the signals in the appropriate order for producing the global digital video signal SVN.

Buffer memories may be provided at various places in the circuit, to store the digital values received or transmitted, according to the requirements of temporary storage which are necessary for the operation of the circuit. Typically, given that the content of the correction table has to be updated at certain moments, it will be understood that a digital value which has to be corrected by the correction table has to wait in a buffer memory upstream of the table throughout the necessary duration of the updating of the table. Buffer memories TMPD and TMPG have therefore been represented by way of example at the input of the circuit CTN, in the right pathway and in the left pathway. The size of these buffer memories may depend on the nature of the division between zones: left/right division or top/bottom division. Selectively addressable buffer memories or temporary storage registers may be provided at other places in the circuit as a function of the timeout requirements necessary for the operation of the circuit.

The role of the correction table TC in the left pathway is to match a corrected value, coded on N bits, with each digital signal value, likewise coded on N bits, which shows up at the input of the table. The addressing input of the correction table therefore receives the digital value $b_i$ representing the signal for a given image point. The table outputs the content $b'_i$ present at this address and this content is a digital value which represents a corrected signal value, which is slightly different from the input value. The content of the table is globally such that the nonlinearities of the left processing pathway are rendered as identical as possible to the nonlinearities of the right reference pathway. The table is a volatile work memory; it can be loaded initially from a non volatile memory TC0, when starting a snapshot, as will be explained later.

The table TC can contain at each address a corrected data item coded on more than N bits, this being so as to increase the accuracy of the intermediate calculations serving to dynamically compute the content of the table; however, in its role of correcting the left pathway, the table transmits only a value coded on N bits to the circuit CRG since the amalgamating circuit has to see the arrival of signals similar to those which it could receive directly from the converters CAND and CANG.

A processor MC serves to perform the dynamic modification of the content of the correction table TC, on the basis of the images actually observed by the sensor, so as to balance the two pathways as far as possible. The processor is a programmable microcontroller or a dedicated processor, which caters both for the management of reading and of writing of the memories and the calculations for correcting the content of the correction table. It can also control the amalgamating circuit CRG. The processor receives the synchronization signals necessary for overseeing the operation of the assembly.

The establishing of the content of the correction table TC is done according to an iterative scheme, managed by the processor, this scheme comprising calculation operations and operations of frequent writing of new values to the table. Since the updating of the table is performed during the actual use of the sensor, it is necessary to provide for the sequencing of the operations of the processor MC to be such that operations of writing to the table TC do not disturb the transmission of the image signals to the amalgamating circuit CRG. The monitoring of the buffer memories TMPG and TMPD by the processor MC helps to decouple the correction table reading and writing operations.

When starting a new snapshot, the content of the non volatile memory TC0 is placed globally in the volatile table TC. This content preferably represents a realistic interim estimation of the corrections to be made to the signal of the left pathway. The table TC0 may have been defined in the factory by means of measurements made on the basis of reference charts. It may also be a neutral correction table (identity table), that is to say one which matches each input value coded on N bits with an output value equal to the input value. Finally, one may also envisage the correction table being produced with the aid of a non volatile memory filled from the TC table at the end of the previous use of the sensor. In all cases, the initial loading of the table TC from a table of values which are close to the desired final result serves only to accelerate the procedure for convergence of the content of the table to a stable content, updated with each use.

The manner in which the correction table is regularly updated during normal operation on the basis of analyzing the points situated at the border of the left and right zones will now be explained in detail.

Figure 3:
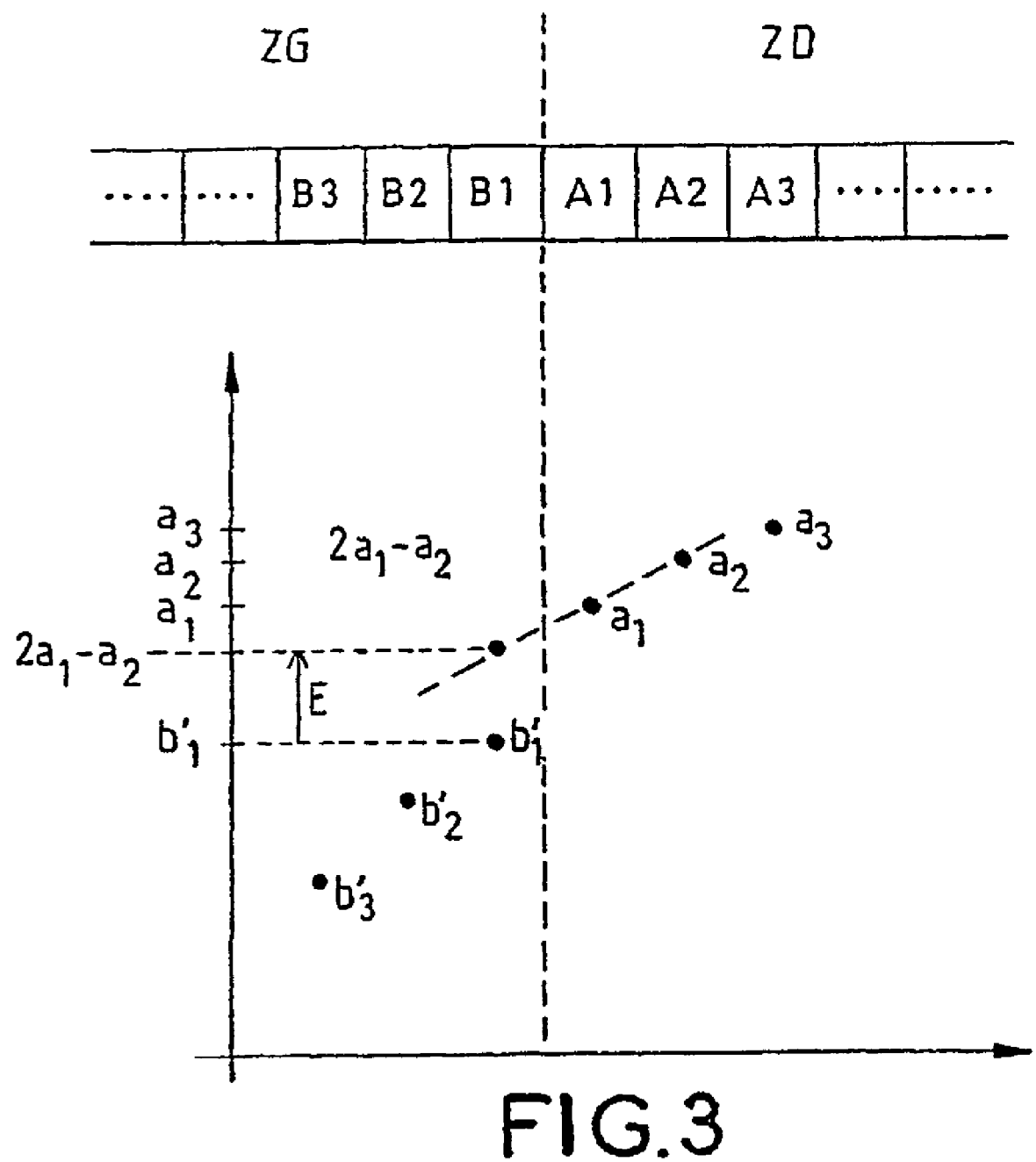
FIG. 3 represents the principle of calculation of divergence at the border for establishing a correction of the table.

Considered in FIG. 3 is a series of points A3, A2, A1 of the right zone, which are situated on a line of image points, in proximity to the border between zones, and a series of points B1, B2, B3 . . . which are situated on the same line on the other side of the border, the points A1 and B1 being the border points. The converters supply digital values a1, a2, a3, b1, b2, b3 for these points. The values b1, b2, b3 of the left pathway are transformed into values b'1, b'2, b'3 by the correction table TC. The outputs of the right and left processing pathways are therefore a1, a2, a3 and b'1, b'2, b'3.

According to the invention, one seeks to measure an abnormal divergence E between the measurements originating from the two pathways.

According to a first process it would be possible simply to use, as measure of the divergence, the discrepancy between a1 and b'1, to decide whether the correction table performs an appropriate or inappropriate correction for the level b1 received by the table: a zero discrepancy would signify that the correction is appropriate for the level b1. This process starts from the realistic assumption that in a real image two adjacent points of the image very often have identical values; this is because the luminances do not alter rapidly from one point to a neighboring point, especially for a high-resolution sensor.

However, to further improve the process, it is preferred to consider a slightly more complex divergence measure, involving the luminance gradient present in the actual image at the border between left zone and right zone. It is therefore considered that if the values a1 and a2 of the points A2 and A1 show the presence of a luminance gradient, then it is probable that the point B1 ought to be deduced by linear extrapolation on the basis of this gradient and ought to have a value a1−(a2−a1), that is to say 2a1−a2. One returns moreover to the previous case if the values a1 and a2 are equal (zero gradient).

The measured divergence is then the discrepancy E=2a1−a2−b'1 and it is on the basis of this discrepancy rather than the simple discrepancy a1−b'1 that corrections to be made are determined. It will be understood that it would also be possible to envisage yet more complex measures of divergence, of second order, involving for example the point A3, or involving not only the points A2 and A3 but also the points B2 and even B3, the general idea being to ensure continuity of the luminance curve at the border; in the general case, the calculation of the discrepancy E on the basis of the linear extrapolation of the values of the points A2 and A1 is sufficient.

Regardless of the manner in which the divergence E is calculated, it is considered that if it is zero it is because the table corrects the input signal properly when this signal has the value b1.

If it is not zero, it is because the table does not correct the signal properly when it has the value b1. Hence, a correction to be made to the table TC, at least at the input address with value b1, is deduced therefrom.

However, on the one hand it is not enough to correct the table at the address b1; quite the contrary, the table is corrected for a whole series of addresses around b1, and even, preferably, the whole table is corrected on the basis of the discrepancy detected for the value b1.

And on the other hand, the correction of the table does not consist in adding the detected discrepancy E to the content b'1 present at the address b1 so as to zero this discrepancy for the level b1 but it consists in adding only a small fraction of this discrepancy. The reason for this is that one wishes to carry out a convergent iterative procedure so as to end up in a progressive manner with a stable content of the table for all its addresses.

The procedure therefore establishes a small correction of the table on the basis of the measurement of discrepancy for a pair of border points A1, B1. This procedure is repeated for another pair of points of the same image or of the succeeding images. This other pair will perhaps correspond to another level of luminance at the input of the table TC. A small correction will be made to the table in respect of this new luminance level and in respect of the neighboring levels, or even in respect of the whole table.

Since the images are actual ones, reliance is placed on the fact that statistically luminance levels corresponding almost to the whole range of possible values between black and white will be encountered in the current image or in the succeeding images. Reliance is also placed on the fact that the correction deemed necessary for a signal level b1 will induce nearly identical corrections on the neighboring levels so that it is not necessary to ensure that all the possible input levels b1 have indeed been the subject of a detection at the border.

The procedure for correcting the whole table on the basis of the detection of a discrepancy detected for a level b1 is preferably the following:

If a discrepancy E(b1) is detected for a signal level b1 at the input of the table, that is to say for an address b1 of the table, the content of the table is corrected sequentially at all the addresses $i_i=b_i$, where i is an index varying from 0 to $2^N-1$ according to the sequential procedure which will be indicated hereinbelow and which depends on the sign of the discrepancy E(b1). It will be noted that it would be possible to envisage correcting only a part of the table around the input addresses b1, but the correction of the whole table is satisfactory and has the advantage of being systematic.

a) If the discrepancy E(b1) is negative (b'1 is higher that it ought to be and it is therefore necessary to bring down the content of the table at the address b1); the correction of the table is made in ascending order from 0 to $2^N-1$ of the addresses $i_i=b_i$ of the table (for reasons of monitoring of the monotonicity of the table, as will be explained later) and it is the following:

For each i ascending from 0 to b1, the value $dE_i=k.E(b1).i/b1$ is added to the previous content $b'_i$ of the table at the address i so as to obtain a new value $b'_i$ at this address; k is a multiplier coefficient of small value, for example 0.05 or less, making it possible to perform progressive and non-abrupt corrections so as to end up in a convergent manner, with no oscillations, at a stable table; the coefficient k represents the fact that even if an imbalance E is noted between zones, only a fraction kE of this imbalance is corrected. The imbalance will be reduced progressively in tandem with the iterations of the writing of the table. The value of k is a compromise between stability of the servo control and speed of establishment of a stable content. Moreover, for these values of i less than b1, the correction made is not constant for the various addresses, since the content of the table is corrected by a fraction of E which is very small for small values of i and becomes larger and larger as i ascends up to b1: the correction made, equal to k.E(b1).i/b1, is proportional to i and attains k.E(b) only for i=b1.

For i>b1 a constant correction $dE_i=k.E(b1)$ is then added to the previous content $b'_i$ of the table at the address $i=b_i$.

However, if in the sequence it is noted that the content $b'_i$ of the table at the address i becomes, owing to the correction, less than the content $b'_{i-1}$ at the address i−1, then we put $b'_i=b_{i-1}$. The purpose of this is to ensure the desirable monotonicity of the correction table, that is to say to ensure that the content of the table at any address is not less than the content of the table at any immediately preceding address. It is by virtue of this procedure for verifying the monotonicity of the correction table that the calculation and writing at addresses taken in the order of ascending values of i when the detected discrepancy E(b1) is negative are performed.

b) If the discrepancy E(b1) is positive (b'1 is below what it ought to be), this time the table is corrected in descending order of the addresses i from $2^N-1$ to 0, again to allow a procedure ensuring the monotonicity of the table. The same corrections as above are made to the content of the table depending on whether the address i is either greater than the address b1 (the correction made is then constant and equal to k.E(b1)) or less than the address b1 (the correction is diminishing, equal to k.E (b1).i/b1 and reaching 0 for i=0).

To ensure monotonicity, it is envisaged that if the calculation were to imply that the new content at the address i is greater than the content determined for the address i+1, then we would set $b'_i=b'_{i+1}$.

Finally, for safety, it may be stipulated that if a calculated content is greater than $2^N-1$, then the content is clipped at $2^N-1$. There is indeed no reason for the signal on a processing pathway to exceed the maximum level for which the signal is coded.

It is understood that the correction calculations involve small numerical values and these small values are added to the present contents in the table. This is why, as mentioned above, it is desirable for the content $b'_i$ of the correction table to be coded on a higher number of bits than N, for example 2N) even if the first N bits alone are subsequently used to correct the left processing pathway.

This algorithm for the iterative calculation of the content of the entire correction table for a detected discrepancy assumes that the black level is correctly established in the sensor itself and that there is no need to correct it; this means that for the input address 0 of the correction table, corresponding to a black level at input, the content of the table is set to 0. Physically, most of the sensors possess a system for fixing the black level (defined by image points protected from light) at a potential imposed at the input of the analog/digital converters, so that there is no need to balance the black levels of the various processing pathways. Had there been a need, the invention would also be usable, but the correction calculation algorithm would have to take account thereof.

Figure 4:
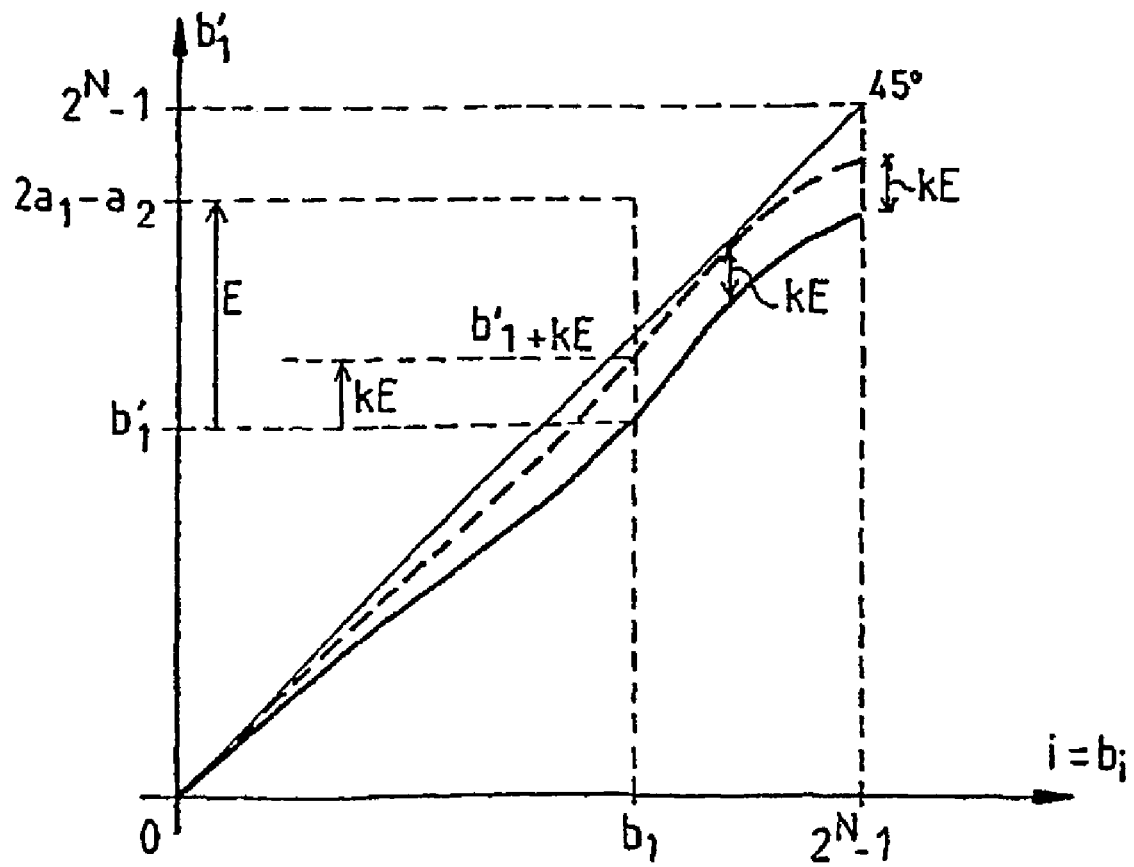
FIG. 4 represents, in a deliberately exaggerated manner, the principle of correcting the entire table in the presence of a divergence detected between the processing pathways.

FIG. 4 illustrates, in a deliberately exaggerated manner, the consequence of the detection of a positive discrepancy E(b1) on the content of the table. The curve represents the difference between the processing pathways for the various signal levels. Along the abscissa are the input addresses $i_i$ of the correction table, hence the various possible levels of digital signal, and along the ordinate is the corrected value $b'_i$ which results from the corrections. If there were no differences in the processing pathways, the curve would be a simple straight line bisecting at 45°. It is assumed that for a signal level b1 at a border point, a positive discrepancy E=2a1−a2−b'1 is detected. We than calculate the fraction kE. All the values of the table below b1 (and in ascending order from 0 to b1 so as to impose the desirable monotonicity of the curve) are corrected by applying a correction increasing from 0 to kE for ascending addresses from 0 to b1. The curve is therefore raised up by kE but progressively, while still passing through zero. Also, all the values of the table above b1 are corrected by raising the curve up by kE. The whole of the curve above b1 is raised up by a constant value kE.

When a discrepancy has been detected for a pair of border points, and when the whole of the content of the table has been reviewed as a function of the discrepancy E detected, it is possible to repeat the procedure, to measure the discrepancy for another pair of border points of the image, and to modify the table again. After a certain number of iterations, involving different image lines (different lines of the same image and then different lines of the succeeding images) hence border points of different-levels, the content of the table almost stabilizes and the corrections made become tiny. Stabilization occurs in practice in less than one second.

Finally, there is preferably provision, in order to preserve good uniformity of the scale of the corrected signal levels, to smooth the content of the table from time to time. The smoothing algorithm can consist quite simply in taking, for all the addresses i of the table, three or five or seven consecutive points (addresses i−1, i, i+1 if three points are taken), and in replacing the content $b'_i$ at address i by a weighted average of the contents $(b'_{i-1}, b'_i, b'_{i+1})$ of the table at these consecutive addresses, for example replacing $b'_i$ by $(b'_{i-1}+2b'_i+b'_{i+1})/4$ for a smoothing over three points.

This smoothing operation can be performed from time to time, for example once every 50 or 100 steps of writing the table. It precludes physically unlikely irregularities of the correction curve.

Given that the invention is based on the analysis of multiple pairs of border points of the actual image, in such a way that detections of discrepancy E can be measured for the entire range of possible signal levels, the system for error calculation, for correction calculation, and for writing to the table must be able to process a large number of pairs of border points.

Ideally, it would be possible to make a complete correction loop of the table at each line of the video signal (in the configuration with two lateral zones, right and left). The entire table would thus be corrected before receiving another line. This requires very considerable speed of calculation on the part of the processor.

It is also possible to take on the fly, at the end of each iteration, the first line which turns up in the current image, do the calculation, and recommence for a succeeding line which turns up whatever it be. Little by little, all kinds of border points will be processed.

It is also possible to measure the discrepancies over all the lines of a current image, by storing the lines in a buffer memory, and by taking the time to analyze them one by one, the time required to iteratively establish a stable table, even if during this time the signal of the sensor continues to produce other images. This makes it possible to traverse all the lines of an actual image with certainty, in an order that can be chosen and which may be pseudo-random rather than ordered.

It is also possible to average measurements over several successive lines.

The invention has been described with regard to a sensor divided into two lateral zones, where the border points are situated on one and the same line. The two border points reach the CTN circuit at the same time, thereby easing the calculation of the discrepancy. If the division were into a top zone and a bottom zone, the border points would be on one and the same column and on two adjacent lines. The sensor would then in principle comprise a top read register and a bottom register, and the two adjacent lines would in principle reach the CTN circuit together.

The invention claimed is:

1. A method of processing an image in an image sensor, comprising the steps of:

dividing the sensor into at least a first zone and a second zone separated by a border, each zone associated with a respective processing pathway, with a view to eliminate the defects due to differences between these pathways, in which the first zone is regarded as reference zone and the associated processing pathway is regarded as reference pathway, and the other pathway is regarded as a pathway to be corrected;

using a correction table in the pathway to be corrected, said correction table having an input for receiving a signal level and an output for providing a respective corrected signal level for each value of signal level received on the input;

modifying iteratively the correction table, during each new use of the sensor by measuring signal levels arising from the processing pathways for a group of border points around the border between the two zones;

determining an abnormal divergence between the measurements on either side of the border, this divergence being the consequence of an inappropriate correction of one particular signal level value by the table;

storing new values in the correction table for the one particular signal level value and for several other signal level values of the correction table around the one particular signal level for which the correction is inappropriate; and repeating the measuring, determining and storing steps for other groups of border points.

2. The method as claimed in claim 1, wherein the modifications performed are sufficiently small as to end up with a progressively stabilized table.

3. The method as claimed in claim 1, wherein the divergence is defined by a discrepancy value between the value of the signal level supplied by the pathway to be corrected for a border point in the second zone and an extrapolation of the values supplied by the reference pathway for neighboring points situated in the first zone on the other side of the border.

4. The method as claimed in claim 1, wherein a correction value equal to a fraction of the determined divergence is added to the previous content of the correction table for the one particular signal level and for said several signal level values of the table around the one particular level value.

5. The method as claimed in claim 4, wherein the correction made to the content of the table for said several signal level values depends on the level value, and is progressively decreasing down to zero for level values decreasing below the said one particular level for which an abnormal divergence is noted.

6. The method as claimed in claim 5, wherein the correction made to the content of the table for said several signal level values is the same for those values which are greater than or equal to the one particular level for which an abnormal divergence is noted.

7. The method as claimed in claim 4, wherein said several values comprise all signal level values in the table.

8. The method as claimed in claim 2, wherein the divergence is defined a by discrepancy value between the value of the signal supplied by the pathway to be corrected for a border point in the second zone and an extrapolation of the values supplied by the reference pathway for neighboring points situated in the first zone on the other side of the border.

9. The method as claimed in claim 3, wherein a correction value equal to a fraction of the determined divergence is added to the previous content of the correction table for the one particular signal level value and for said several signal level values of the table around the one particular level value.

10. The method as claimed in claim 5, wherein said several values comprise all signal level values in the table.

11. The method as claimed in claim 6, wherein said several values comprise all signal level values in the table.

12. The method as claimed in claim 2, wherein a correction value equal to a fraction of the determined divergence is added to the previous content of the correction table for the one particular signal level value and for said several signal level values of the table around the one particular level value.

13. A device for electronic image capture comprising:

a matrix image sensor divided into at least a first zone and a second zone separated by a border, said zones supplying a digital value for each image point, this digital value being computed in a first processing pathway for the points of the first zone and in a second processing pathway for the points of the second zone, the processing pathways being at least partly distinct, the second processing pathway using balancing means for eliminating the visible defects engendered by the small differences existing between the two processing pathways, wherein a balancing means comprise a digital conversion table, said conversion table having an input for receiving a signal level and an output for providing a respective corrected signal level for each value of signal level received on the input;

and means for dynamically modifying the content of this table on the basis of an analysis of a divergence between on the one hand the digital values of the signals arising from one processing pathway and corresponding to border points situated on one side of the border in the first zone and on the other hand the digital values of the signals arising from the other processing pathway and corresponding to border points situated on the other side of the border in the second zone, for any image observed while using the device, the modification being performed for a one particular signal level value for which an abnormal divergence is noted, and for several other signal level values of the correction table around the one particular signal level value.

14. The device for image capture as claimed in claim 13, comprising means for calculating a divergence value $E=2a1-a2-b'1$ where $a1$ and $a2$ are signal level values for two points in the first zone close to the border and $b'1$ is a corrected value for a corresponding point in the second zone, close to said two points.

15. The device as claimed in claim 14, comprising means for writing into the correction table, for said several signal level value, corrected contents which are equal to a previous content plus, a fraction of the divergence value.

16. The device as claimed in claim 15, wherein said fraction is constant for the signal level values above the one particular signal level value and is progressively decreasing down to zero for level values decreasing below the said one particular level.

17. The device as claimed in claim 16, said several values comprise all signal level values in the table.

* * * * *